US008441479B2

(12) United States Patent
Ushida et al.

(10) Patent No.: US 8,441,479 B2
(45) Date of Patent: May 14, 2013

(54) THREE DIMENSIONAL DATA PROCESSING DEVICE AND METHOD, THREE DIMENSIONAL IMAGE GENERATING DEVICE, NAVIGATION DEVICE, AND COMPUTER-READABLE MEDIUM CONTAINING THREE-DIMENSIONAL DATA PROCESSING PROGRAM

(75) Inventors: Koichi Ushida, Aichi (JP); Kazuyoshi Yamamoto, Hokkaido (JP)

(73) Assignee: Aisin Aw Co., Ltd., Aichi (JP)

( * ) Notice: Subject to any disclaimer, the term of this patent is extended or adjusted under 35 U.S.C. 154(b) by 881 days.

(21) Appl. No.: 12/338,118

(22) Filed: Dec. 18, 2008

(65) Prior Publication Data
US 2009/0167759 A1 Jul. 2, 2009

(30) Foreign Application Priority Data
Dec. 26, 2007 (JP) .................................. 2007-334362

(51) Int. Cl.
*G06T 17/00* (2006.01)

(52) U.S. Cl.
USPC ........................................................ 345/420

(58) Field of Classification Search .................. None
See application file for complete search history.

(56) References Cited

U.S. PATENT DOCUMENTS

| 6,359,623 | B1 * | 3/2002 | Larson | 345/501 |
| 2005/0012742 | A1 * | 1/2005 | Royan | 345/419 |
| 2007/0258650 | A1 * | 11/2007 | Marchal et al. | 382/232 |
| 2007/0268291 | A1 * | 11/2007 | Naoi | 345/422 |

FOREIGN PATENT DOCUMENTS

| JP | 06-168340 A | 6/1994 |
| JP | 11-259674 A | 9/1999 |
| JP | 2000149055 A | 5/2000 |
| JP | 2002-188928 A | 7/2002 |
| JP | 2003-271988 A | 9/2003 |
| WO | 2006-003267 A1 | 1/2006 |
| WO | 2006-003268 A1 | 1/2006 |
| WO | WO 2006003268 | * 1/2006 |

OTHER PUBLICATIONS

Machine translation of WO 2006003268 Loic Bouget, "General method for determining a list of elements potentially visible by region for three-dimensional large scenes representing virtual variable altitude cities.", publication date Jan. 12, 2006.*

(Continued)

*Primary Examiner* — Hau Nguyen
*Assistant Examiner* — Ryan M Gray
(74) *Attorney, Agent, or Firm* — Lowe Hauptman Ham & Berner, LLP

(57) ABSTRACT

A three-dimensional data processing device includes a bounding volume generating unit for generating a bounding volume of a solid body using stereographic data of the solid body, a view volume setting unit for setting a view volume based on a set viewpoint, and a culling processing unit for determining whether or not to draw the solid body within the view volume using the generated bounding volume. The bounding volume generating unit obtains bottom plane data of the solid body from the stereographic data, obtains an outer quadrangular frame that encloses a bottom plane of the solid body defined by the bottom plane data, obtains an inner quadrangular frame inscribed on the outer quadrangular frame, determines bounding volume geometry data using the inner quadrangular frame as a reference plane, and generates the bounding volume of the solid body from the bounding volume geometry data.

19 Claims, 5 Drawing Sheets

OTHER PUBLICATIONS

Loic Bouget, "General method for determining a list of elements potentially visible by region for three-dimensional large scenes representing virtual variable altitude cities", Jan. 12, 2006, WO 2006003268.*

Decoret X et al; "Erosion based visibility preprocessing," Eurographics Symposium on Rendering, XX, XX, Jun. 25, 2003, pp. 281-288, XP002322894.

Maim, Jonathan; Haegler, Simon; Yersin, Barbara; Muller, Pascal; Thalmann, Daniel; Van Gool, Luc, "Populating Ancient Pompeii with Crowds of Virtual Romans," Proceedings of the 8th International Symposium on Virtual Reality, Archeology and Cultural Heritage—VAST, Nov. 26, 2007, XP002644747.

European Search Report for European Application No. 08 02 1360 dated Jun. 24, 2011.

JP Office Action for 2007-334362 dated Sep. 22, 2011.

* cited by examiner

THREE DIMENSIONAL DATA PROCESSING DEVICE AND METHOD, THREE DIMENSIONAL IMAGE GENERATING DEVICE, NAVIGATION DEVICE, AND COMPUTER-READABLE MEDIUM CONTAINING THREE-DIMENSIONAL DATA PROCESSING PROGRAM

RELATED APPLICATIONS

The instant application claims the benefit of Japanese Patent Application No. 2007-334362 filed on Dec. 26, 2007 the entire disclosure of which, including the specification, drawings and abstract, is incorporated herein by reference.

BACKGROUND

1. Technical Field

The disclosure relates to a three-dimensional data processing technique for two-dimensionally displaying a three-dimensional space using stereographic data pertaining to a solid body.

2. Description of the Related Art

Computational processing by a computer plays a central role in two-dimensionally displaying a three-dimensional space using stereographic data pertaining to a solid body, namely, in rendering three-dimensional graphics. Computers with a graphic processing function have achieved higher performance and become more integrated (on one chip), which has made the application of a three-dimensional graphics rendering function possible in various technical fields, such as a navigation device mounted in an automobile or the like, for example, thus realizing a three-dimensional map display.

According to a ray tracing method utilized for such rendering of three-dimensional graphics, a ray is traced from a viewpoint toward the direction of a solid body. If the ray and the object intersect, then the mode of light of the object at the intersection point is found, and a two-dimensional image is created by projecting this on an image screen. However, an intersection point calculation to find the intersection of the ray and the object takes an extremely long time and a faster method is needed. For example, excluding unnecessary solid bodies within a view volume, i.e., a three-dimensional space targeted for a two-dimensional display, from a rendering target in advance can reduce the rendering process (three-dimensional image drawing process) load. Such an exclusion process is called a culling process, and there is a method that utilizes a bounding volume which can further speed up the culling process.

A conventional bounding volume has a simple geometry such as a sphere (bounding sphere) or rectangular solid shape (bounding box), and encloses one or a plurality of solid bodies. In other words, the bounding volume is a simple geometric body capable of covering an entire solid body. A drawing process can be performed faster by determining whether the bounding volume and the ray intersect, and then sending only the solid body enclosed by the bounding volume where the bounding volume and the ray intersect to a final drawing process, thereby eliminating a computation to find intersections of the ray with unnecessary solid bodies. Various methods for setting such a bounding volume are known (see Japanese Patent Application Publication No. JP-A-H06-168340, paragraphs 0001 to 0007, and Japanese Patent Application Publication No. JP-A-2003-271988, paragraphs 0002 to 0022, for examples).

In the above conventional method for setting the bounding volume, the bounding volume is set so as to enclose the solid body. Therefore the bounding volume has a size larger than the solid body in all directions. Accordingly, a forward bounding volume located in front of the viewpoint and represented with an excessive size hides a rearward bounding volume that is located therebehind, and the rearward bounding volume is thus culled. However, this creates a problem in that a solid body that should be visible in the three-dimensional image ultimately rendered cannot be seen (is not drawn). In particular, a bounding volume used in a map navigation system or the like in particular uses a bounding box parallel to reference axes and whose sides when cross-sectioned are parallel to a reference longitudinal axis and a reference lateral axes, which are commonly known as east longitude and north latitude coordinate axes. For this reason, the bounding box is considerably larger than the actual solid body (a polygon of the solid body), thus exacerbating the problem. When a bounding box parallel to reference axes is used, a visual axis extending from the viewpoint to the solid body becomes inclined with respect to the reference axes, and a region masked by the bounding box parallel to the reference axes becomes significantly larger than a region masked by the actual solid body, thus further exacerbating the above problem.

In light of the foregoing problem(s), there is a need to provide a three-dimensional data processing technique for generating a geometric object simplified into a bounding volume while also making a three-dimensional image ultimately rendered appear more natural, a three-dimensional image generating device using such a three-dimensional data processing technique, and a navigation device incorporating the three-dimensional image generating device.

SUMMARY

In some embodiments, a three-dimensional data processing device for two-dimensionally displaying a three-dimensional space using stereographic data pertaining to a solid body comprises: a bounding volume generating unit for generating a bounding volume of the solid body using the stereographic data of the solid body and using, as a reference plane, an inner quadrangular frame inscribed on an outer quadrangular frame that encloses a plane outer profile of the solid body; a view volume setting unit for setting a view volume based on a set viewpoint; and a culling processing unit for determining whether or not to draw the solid body within the view volume using the generated bounding volume.

In further embodiments, a three-dimensional image generating device comprises the three-dimensional data processing device as described; and a three-dimensional image drawing unit wherein a three-dimensional image is generated in the view volume with reference to a determination result made by the culling processing unit.

In further embodiments, a navigation device comprises a position information detecting unit for detecting a current position of the navigation device; and the three-dimensional image generating device as described, wherein the viewpoint is determined based on the current position detected by the position information detecting unit, and a visual axis from the viewpoint is determined so as to follow a guidance route from the current position to a destination.

In further embodiments, a computer-readable medium contains a three-dimensional data processing program for two-dimensionally displaying a three-dimensional space using stereographic data pertaining to a solid body, said program when executed by a computer platform causing said computer platform to perform the functions of: generating a bounding volume of the solid body using the stereographic data of the solid body and using, as a reference plane, an inner quadrangular frame inscribed on an outer quadrangular frame that encloses a plane outer profile of the solid body; setting a view volume based on a set viewpoint; and determining whether or not to draw the solid body within the view volume using the generated bounding volume.

In further embodiments, a method of two-dimensionally displaying a three-dimensional space using stereographic data pertaining to a solid body, comprises: generating a bounding volume of the solid body using the stereographic data of the solid body and using, as a reference plane, an inner quadrangular frame inscribed on an outer quadrangular frame that encloses a plane outer profile of the solid body; setting a view volume based on a set viewpoint; and determining whether or not to draw the solid body within the view volume using the generated bounding volume.

BRIEF DESCRIPTION OF THE DRAWINGS

One or more embodiments are illustrated by way of example, and not by limitation, in the figures of the accompanying drawings, wherein elements having the same reference numeral designations represent like elements throughout, and wherein.

DETAILED DESCRIPTION OF EMBODIMENTS

Exemplary embodiments will be described based on the accompanying drawings.

Figure 1:
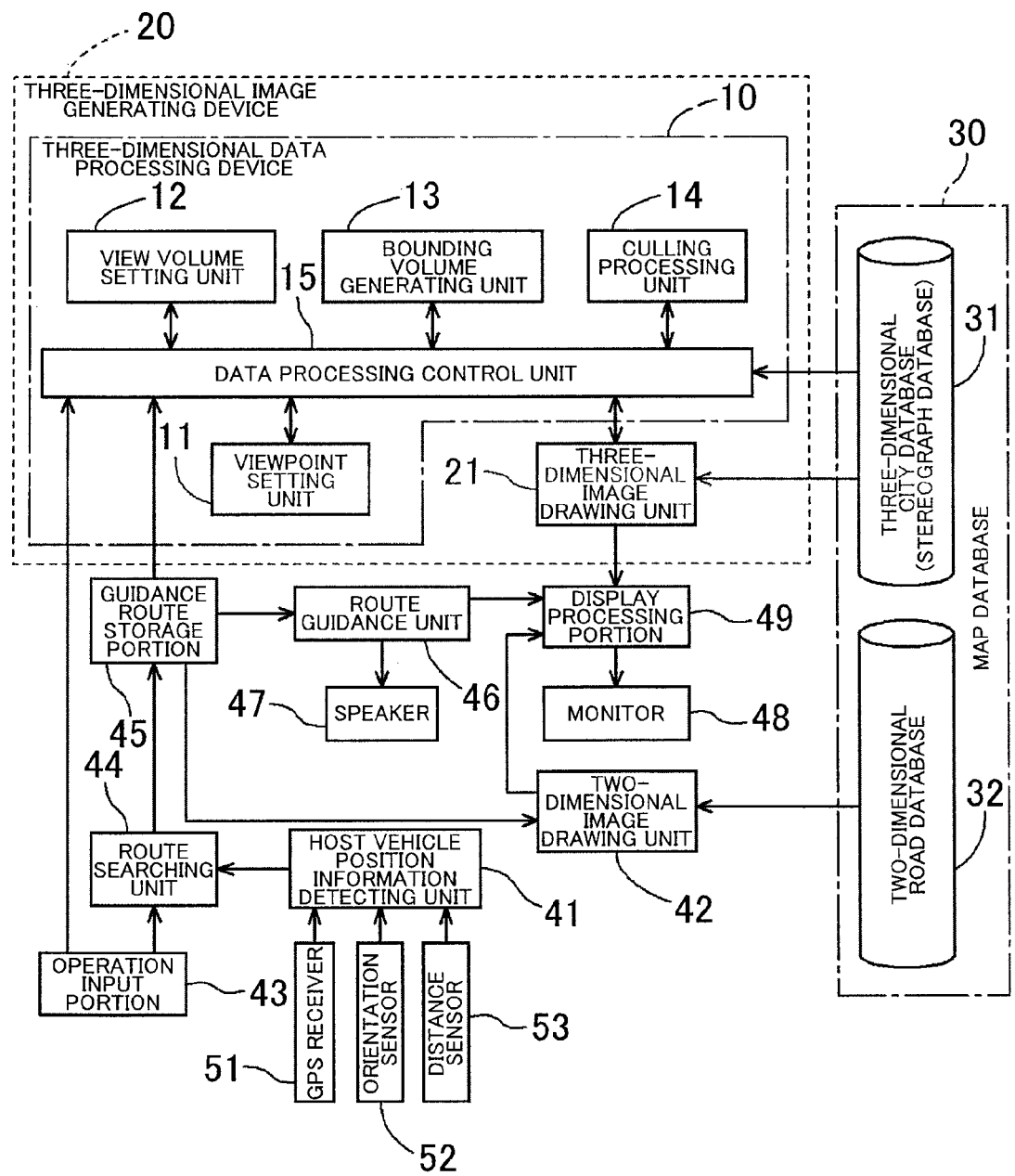
FIG. 1 is a block diagram showing a configuration of a navigation device according to an embodiment.

FIG. 1 is a block diagram schematically showing a configuration of a navigation device, e.g., for use in a vehicle such as an automobile, according to an embodiment. Other arrangements are, however, not excluded. For example, the navigation device in some embodiments is a portable device arranged for use by a pedestrian or hiker or rider etc. Such a navigation device can include any vehicle-built-in or after-market devices as well as mobile or portable devices, such as cellular telephones, personal digital assistants, laptop or tablet computers etc. Generally, a navigation device includes a hardware computer platform that can execute software applications and display guidance data. A computer platform in some embodiments includes an application-specific integrated circuit ("ASIC"), or other chipset, processor, microprocessor, logic circuit, or other data processing device. The computer platform also includes at least one external/removable or internal/built-in storage and/or memory unit which may include volatile and/or non-volatile memory (RAM and ROM), EPROM, EEPROM, flash cards, magnetic media, optical media, tape, or soft or hard disk or any memory or storage media common to computer platforms. A navigation device can be considered to include multiple units each for performing one or more specific functions. The functions are embodied in hardware either via hardwiring or via software execution on such hardware. Software comprising instructions for execution may reside in a computer-readable medium (i.e., readable and executable by a computer platform) of the type described above, e.g., a random access memory (RAM), a read only memory (ROM), a programmable memory, a hard disk, a compact disc, etc.

The navigation device is capable of a three-dimensional map display, and to achieve this, a three-dimensional image generating device 20 and a three-dimensional data processing device 10 are incorporated in a hierarchical manner therein. A map database 30 includes a three-dimensional city database 31 that stores therein stereographic data for solid bodies and serves as a stereographic database, and a two-dimensional road database 32 that stores therein two-dimensional road data. The map database 30 is structured from a high-capacity storage medium such as a DVD or a hard disk. In addition, when a rewritable storage medium, such as a removable memory card or cartridge, or an irremovable, pre-installed RAM, is employed, fresh map data can be downloaded via data communications as appropriate.

Figure 2:
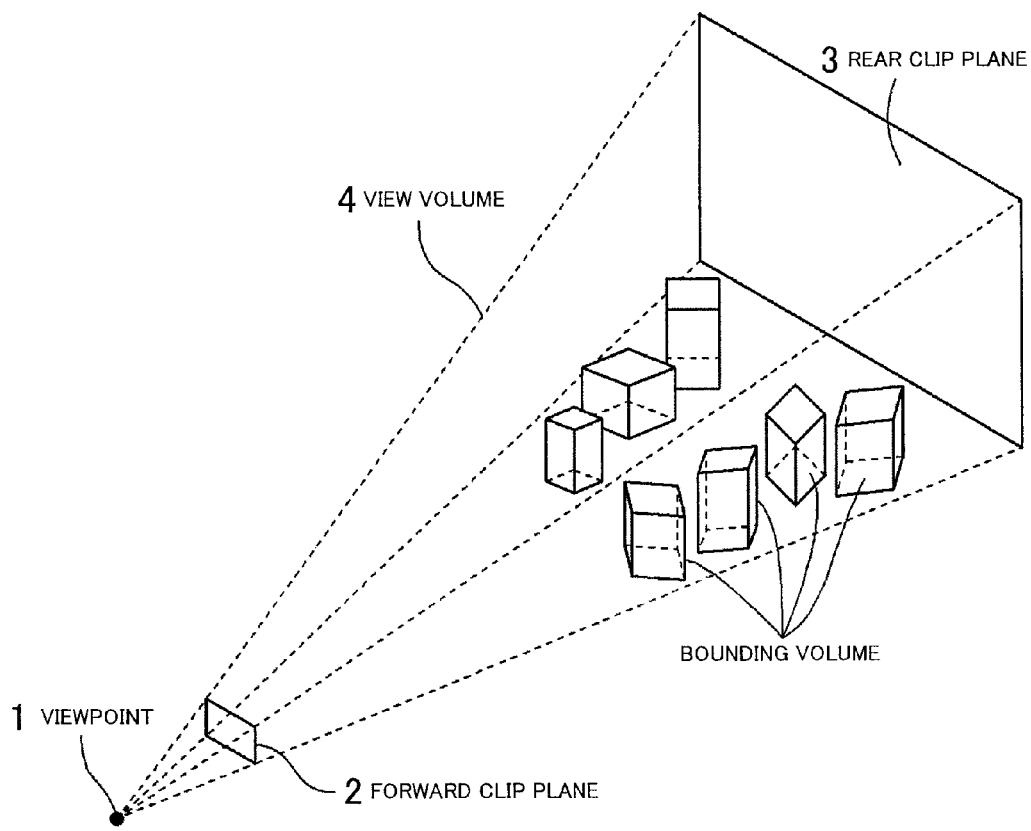
FIG. 2 is an explanatory drawing for explaining a viewpoint and a view volume.

The three-dimensional data processing device 10 includes a viewpoint setting unit 11, a view volume setting unit 12, a bounding volume generating unit 13, a culling processing unit 14, and a data processing control device 15. For three-dimensional computer graphics, as schematically shown in FIG. 2, in the case of a perspective projection where an arbitrary position within a three-dimensional space is set as the center of the projection or a plane including an arbitrary point is set as a projection plane, the center of projection corresponds to the position of an observer's eyes, i.e., a viewpoint 1. The viewpoint 1 is set by the viewpoint setting unit 11. When rendering a solid body within the three-dimensional space according to the set viewpoint 1, a forward clip plane 2 and a rearward clip plane 3 are defined which are planes orthogonal to a visual axis of the viewpoint 1. A quadrangular pyramid in FIG. 2 formed by connecting vertices respectively corresponding to the forward clip plane 2 and the rearward clip plane 3 is a view volume 4. The view volume 4 is set by the view volume setting unit 12.

The bounding volume generating unit 13 has a function for generating a bounding volume of the solid bodies by using stereographic data of solid bodies read out from the three-dimensional city database 31. The bounding volume generating unit 13 generates a bounding volume of the solid body wherein an inner polygonal, e.g., quadrangular, frame inscribed on an outer polygonal, e.g., quadrangular, frame, which encloses a plane outer profile of the solid body subject to processing, is used as a reference plane. The bounding volume generating unit 13 will be described in more detail later. The culling processing unit 14 determines whether the solid bodies located within the view volume 4 are drawing subjects (rendering subjects) within the view volume using bounding volumes thereof. In this embodiment, the culling processing unit 14 employs the occlusion culling method as the culling method. Therefore, if it is determined that a certain bounding volume is completely masked by another bounding volume (at a position where the bounding volume is invisible), then the bounding volume is not considered a subject for drawing. To this end, in general a method is employed that successively sets rays from the viewpoint 1 and determines whether the rays reach the bounding volume subject to processing without becoming masked by another bounding volume. The data processing control device 15, as described above, manages control operations of the viewpoint setting unit 11, the view volume setting unit 12, the bounding volume generating unit 13, and the culling processing unit 14, and also records determination results determined by the culling processing unit 14 in a list. The culling determination result is a code identifying the solid body subject to drawing among the solid bodies located within the view volume 4 or the data of the solid body. The temporarily stored culling determination result is utilized for three-dimensional image drawing (rendering).

The three-dimensional image generating device 20 includes the three-dimensional data processing device 10 as well as a three-dimensional image drawing unit 21 that employs a well known rendering method or the like to generate a three-dimensional image in the view volume 4 using stereographic data of the solid body subject to drawing.

The navigation device is incorporated with the three-dimensional image generating device 20. Therefore, the navigation device has a function for setting the viewpoint 1 based on a host vehicle position detected by a host vehicle position information detecting unit 41, and a function for displaying a three-dimensional map centered on a guidance route that the vehicle is due to travel on by determining the visual axis from the viewpoint 1 so as to follow the guidance route. The navigation device also has a function for displaying an ordinary two-dimensional road map, and is therefore additionally provided with a two-dimensional image drawing unit 42.

A route searching unit 44 searches for an optimum guidance route that links a current position and a point (such as a destination) specified by a user through an operation input portion 43, and the searched guidance route is set by a guidance route storage portion 45. Based on the set guidance route and the host vehicle position, a route guidance unit 46 performs route guidance for the user via a speaker 47 and a monitor 48. At such time, an image generated by the two-dimensional image drawing unit 42 or the three-dimensional image drawing unit 21 or both is sent to a display processing portion 49, and then displayed on the monitor 48 after undergoing processing to superimpose various information and symbols as necessary.

The operation input portion 43 has a function for accepting an instruction from the user, and is structured from a touch panel, a mechanical operation button, a software button, and the like. The touch panel and the software button operating in association with the display processing portion 49 construct a user graphic interface. In addition, the operation input portion 43 can directly instruct the viewpoint 1 including the visual axis to the three-dimensional data processing device 10, and is thus capable of displaying a three-dimensional image based on the viewpoint and the visual axis desired by the user on the monitor 48.

The host vehicle position information detecting unit 41 obtains the host vehicle position information specifying the host vehicle position, i.e., the current position of the host vehicle. In this embodiment, the host vehicle position information detecting unit 41 is connected with a GPS receiver 51, an orientation sensor 52, and a distance sensor 53. Here, the GPS receiver 51 is a device that receives a GPS signal from a GPS satellite. The GPS signal is normally received every second, and output to the host vehicle position information detecting unit 41. In the host vehicle position information detecting unit 41, the signal received by the GPS receiver 51 from the GPS satellite can be analyzed to obtain the current position (latitude and longitude), direction of travel, speed of movement, and the like of the host vehicle. The orientation sensor 52 detects the traveling direction of the host vehicle and changes in the direction of travel. The orientation sensor 52 is structured from a gyro sensor, a geomagnetic sensor, an optical rotation sensor or rotation type resistance volume attached to a rotating portion of a steering wheel, and an angular sensor attached to a vehicle wheel portion, for example, and outputs a detection result thereof to the host vehicle position information detecting unit 41. The distance sensor 53 detects a vehicle speed and a movement distance of the host vehicle. The distance sensor 53 is structured from a vehicle speed pulse sensor that outputs a pulse signal every time a drive shaft, wheel, or the like of the host vehicle rotates a certain amount, a yaw/G sensor that detects an acceleration of the host vehicle, and a circuit that integrates the detected acceleration, for example. Also, the distance sensor 53 outputs information regarding the vehicle speed and the movement distance as a detection result thereof to the host vehicle position information detecting unit 41.

Based on the output from the GPS receiver 51, the orientation sensor 52, and the distance sensor 53, the host vehicle position information detecting unit 41 performs a computation according to a known method to specify the host vehicle position. In addition, the host vehicle position information detecting unit 41 obtains the two-dimensional road data around the host vehicle position from the two-dimensional road database 32. By performing known map matching based thereon, the host vehicle position information detecting unit 41 also corrects the host vehicle position to match the road indicated in the two-dimensional road data. In this manner, the host vehicle position information detecting unit 41 obtains host vehicle position information that includes information regarding the current position of the host vehicle expressed in latitude and longitude, and information regarding the traveling direction of the host vehicle.

Figure 3:
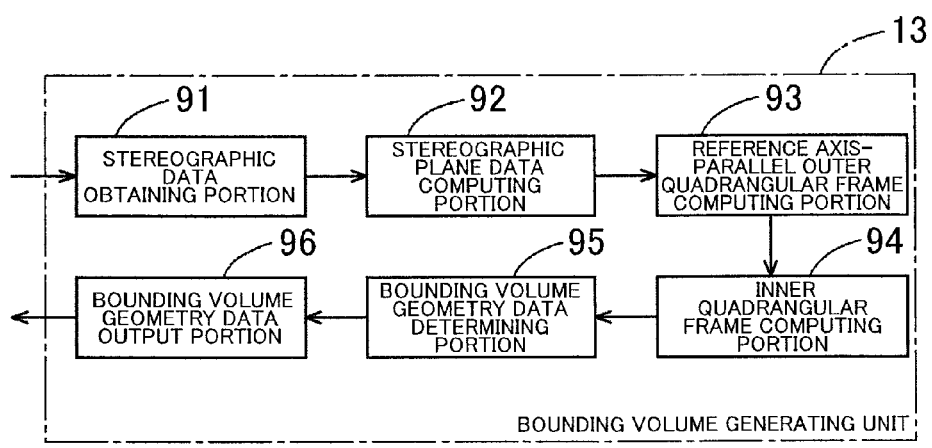
FIG. 3 is a block diagram showing a function of a bounding volume generating unit.

FIG. 3 shows a block diagram illustrating functional elements of the bounding volume generating unit 13. The bounding volume generating unit 13 includes a stereographic data obtaining portion 91, a stereographic plane data computing portion 92, a reference axis-parallel outer quadrangular frame computing portion 93, an inner quadrangular frame computing portion 94, a bounding volume geometry data determining portion 95, and a bounding volume geometry data output portion 96.

The stereographic data obtaining portion 91 stores stereographic data of a solid body subject to processing, which was read from the three-dimensional city database 31, in a working memory, and identifies and controls the stereographic data via a solid body ID. The stereographic plane data computing portion 92 computes from a polygon data group, namely, stereographic data of the solid body subject to processing, plane data for setting a plane outer profile that is a lateral cross section of the solid body. The plane data is bottom plane data, and only the bottom plane data may be extracted from the stereographic data in cases where the bottom plane data is included in the stereographic data read from the three-dimensional city database 31. If the bottom plane data is not included, then the bottom plane data is computed from the polygon data group. Furthermore, in cases where a maximum plane outer profile of the solid body is employed as the plane data or the like, such plane data is computed from the polygon data group.

The reference axis-parallel outer quadrangular frame computing portion 93 has a function for computing the outer quadrangular frame enclosing the plane outer profile, which is set by the plane data computed by the stereographic plane data computing portion 92. In this embodiment, a circumscribed quadrangle tangent to the plane outer profile is employed as the outer quadrangular frame. However, an outer quadrangular frame may also be used wherein at least one side thereof has a predetermined clearance with the plane outer profile. Moreover, in this embodiment, the computed outer quadrangular frame is set so as to have sides that are parallel to a set reference lateral axis (e.g. latitude) and a reference longitudinal axis (longitude). Therefore, it is convenient to transform coordinates of the plane data into a coordinate system based on the reference lateral axis and the reference longitudinal axis before computing the outer quadrangular frame.

The inner quadrangular frame computing portion 94 has a function for computing an inner quadrangular frame (inscribed quadrangle) inscribed on the outer quadrangular frame computed by the reference axis-parallel outer quadrangular frame computing portion 93. In this embodiment, the computed inner quadrangular frame is set as an inscribed quadrangle obtained by linking center points on each side of the outer quadrangular frame. However, other forms of inscribed quadrangles may be employed as the inner quadrangular frame.

The bounding volume geometry data determining portion 95 has a function for determining geometry data (including coordinate position information regarding the coordinate system of the reference axes) required for generating a bounding volume of the solid body subject to processing, using the inner quadrangular frame as a reference plane. In this embodiment, the inner quadrangular frame computed by the inner quadrangular frame computing portion 94 is employed as the bottom plane, and a quadrangular prism geometry extending up to a height portion of the solid body subject to processing is set as the bounding volume. Bounding volume geometry data created by the bounding volume geometry data determining portion 95 is then transferred to the culling processing unit 14 by the bounding volume geometry data output portion 96.

Figure 4:
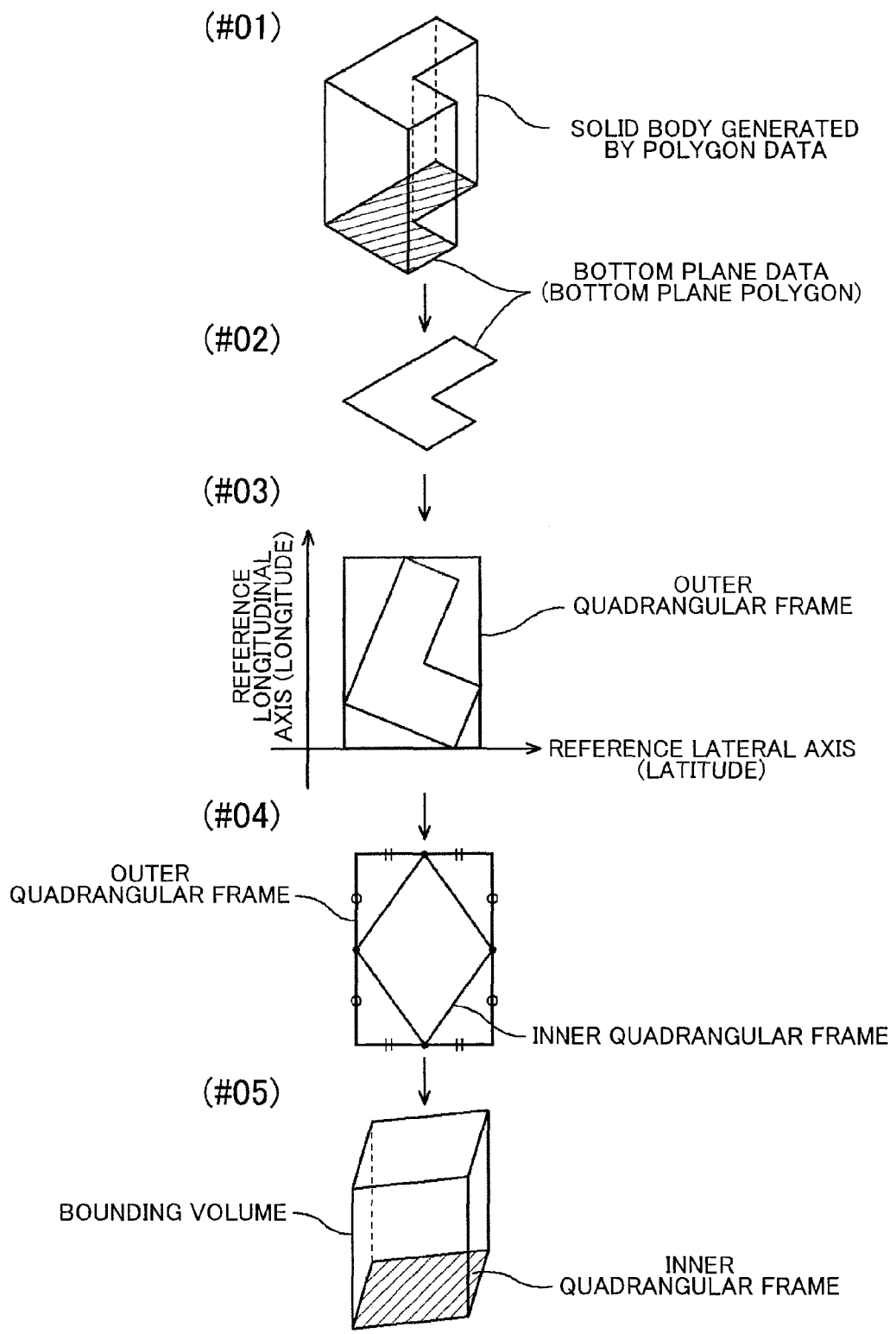
FIG. 4 is a schematic flowchart showing an embodiment of a bounding volume generation procedure.

A procedure for generating a bounding volume from stereographic data using the bounding volume generating unit 13 structured as described above will be explained here. FIG. 4 schematically shows the bounding volume generation procedure. First, stereographic data for an instructed solid body is found among stereographic data (polygon data) of solid bodies stored in the working memory (#01). From the found stereographic data, the bottom plane data (bottom plane polygon) is read out or computed as the plane data representing the plane outer profile of the instructed solid body (#02). The coordinates of the obtained bottom plane data are transformed into the coordinate system formed from the mutually orthogonal reference longitudinal axis (e.g. longitude) and reference lateral axis (e.g. latitude). An outer quadrangular frame is computed such that two sides thereof are parallel to the reference longitudinal axis and the reference lateral axis and a polygon set by the bottom plane data is circumscribed in the coordinate system (#03). Next, an inscribed quadrangle (diamond) created by linking the center points on each side of the computed outer quadrangular frame is computed as the inner quadrangular frame (#04). A quadrangular prism geometry is then created by using the inner quadrangular frame as the bottom plane and extending the quadrangular prism geometry up to the height of the solid body instructed in step #01. The quadrangular prism geometry is thus computed as the bounding volume of the solid body (#05).

Figure 5A:
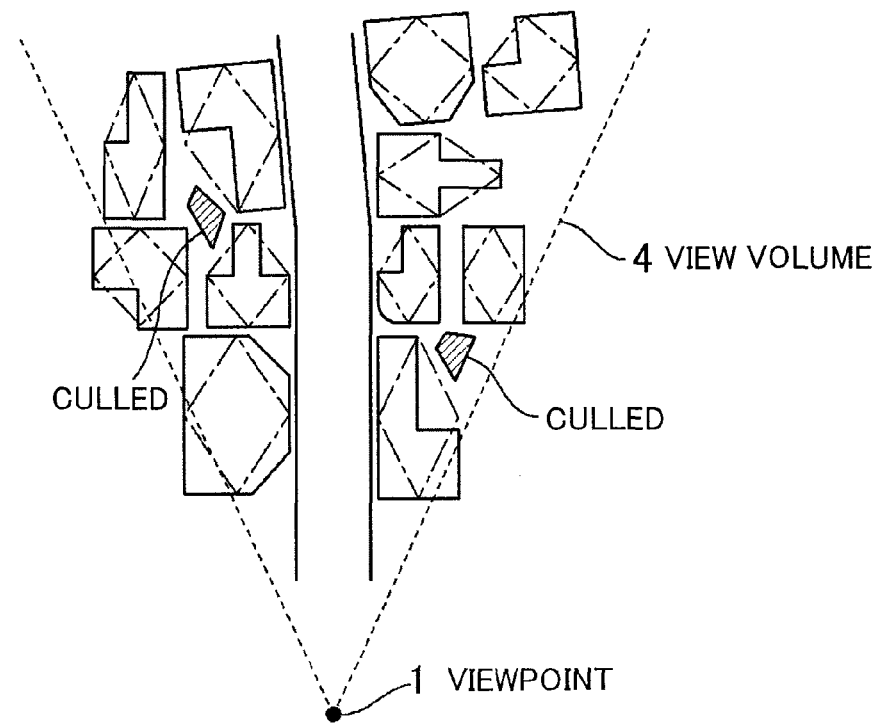
FIG. 5A is an explanatory drawing for explaining an example of the view volume during image rendering.
Figure 5B:
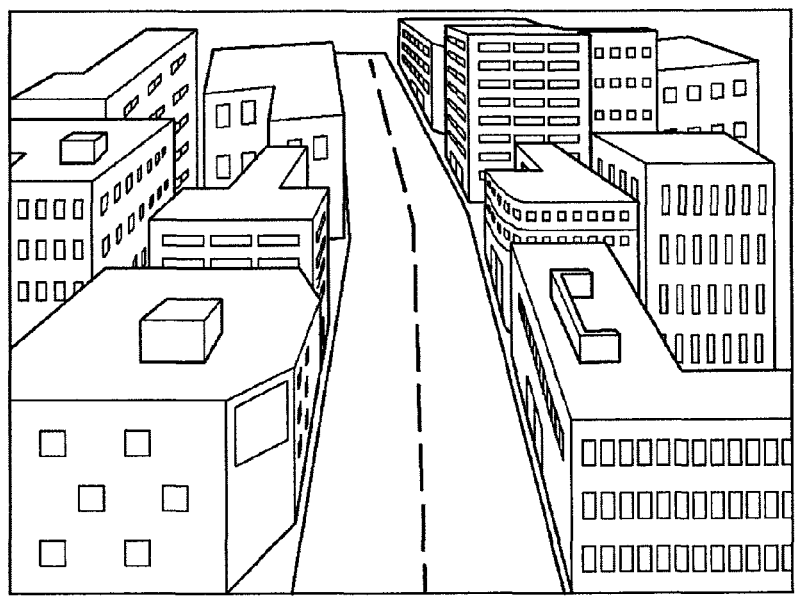
FIG. 5B is a drawing of a monitor display screen of a three-dimensional image drawn using this view volume.

In this manner, once bounding volumes are created for all the solid bodies located in a predetermined area, the culling processing unit 14 performs an occlusion culling process and determines bounding volume to be used for drawing that are located within the view volume 4 and not masked by other bounding volumes. In the three-dimensional image drawing (rendering), the solid body (actually a polygon set by the stereographic data of the solid body) included in the bounding volume for drawing is arranged within the view volume 4 (see FIG. 5A). Drawing is performed by the three-dimensional image drawing unit 21, and an example of a three-dimensional image (three-dimensional map image) displayed on the monitor 48 is shown in FIG. 5B.

Other Embodiments (1) With the bounding volume generating unit 13 of the above embodiment, a quadrangular prism geometry created by using the inner quadrangular frame as the bottom plane and extending therefrom to the height of the solid body subject to processing is generated as the bounding volume of the solid body subject to processing. In other words, the bounding volume has the same lateral cross section. However, the lateral cross sections of actual buildings and the like are often different at upper and lower floors. Taking this into consideration, the bounding volume generating unit 13 may calculate a plurality of inner quadrangular frames for each predetermined height level to generate sub bounding volumes, and generate a final bounding volume by stacking such sub bounding volumes.

Figure 6:
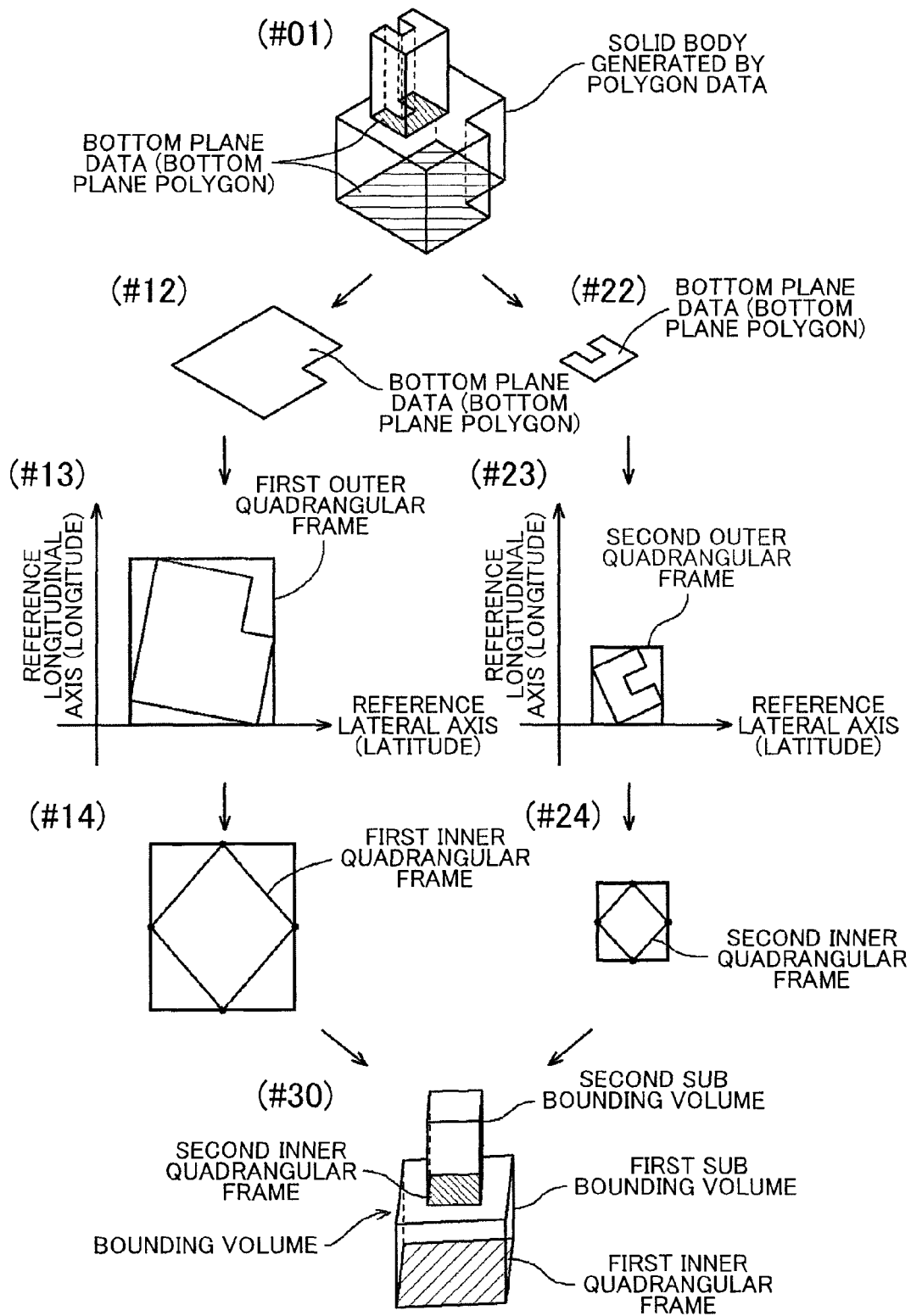
FIG. 6 is a schematic flowchart showing another embodiment of the bounding volume generation procedure.

A procedure for generating a bounding volume from stereographic data using the bounding volume generating unit 13 structured as described above will be explained here with reference to the schematic diagram of the bounding volume generation procedure shown in FIG. 6. Similar to that explained in the previous embodiment using FIG. 4, first, stereographic data for an instructed solid body is found among stereographic data (polygon data) of solid bodies stored in the working memory (#01). Based on the found stereographic data, the respective plane data representing the plane outer profile of the solid body are computed for a predetermined plurality of height levels, which in this case are two height levels: a ground level (bottom plane level), and a height level (called an intermediate level) at which the lateral cross-sectional shape of the solid body considerably changes (#12 and #22). The coordinates of the plane data (bottom plane data) obtained at the ground level are transformed into the coordinate system formed from the mutually orthogonal reference longitudinal axis (e.g. longitude) and reference lateral axis (e.g. latitude). A first outer quadrangular frame is computed such that two sides thereof are parallel to the reference longitudinal axis and the reference lateral axis and a polygon set by the bottom plane data is circumscribed in the coordinate system (#13). Likewise, the coordinates of the plane data obtained at the intermediate level are similarly transformed into the coordinate system, and a second outer quadrangular frame is computed such that a polygon set by the plane data is circumscribed in the coordinate system (#23). Next, an inscribed quadrangle (diamond) created by linking the center points on each side of the first outer quadrangular frame computed at step #13 is computed as a first inner quadrangular frame (#14). Likewise, an inscribed quadrangle (diamond) created by linking the center points on each side of the second outer quadrangular frame computed at step #23 is computed as a second inner quadrangular frame (#24). A first sub bounding volume is then generated by using the first inner quadrangular frame as the bottom plane and then extending the first sub bounding volume therefrom up to the height of the intermediate level. Likewise, a second sub bounding volume is then generated by using the second inner quadrangular frame as the bottom plane and then extending the second sub bounding volume from the intermediate level up to the top of the solid body. A final bounding volume is generated by stacking the second sub bounding volume on top of the first sub bounding volume (#30).

(2) In the description of the bounding volume generating unit 13 in the above embodiment, one bounding volume is generated with respect to one solid body. However, one bounding volume may be generated with respect to a plurality of solid bodies. Especially in cases where solid bodies are arranged in a complex layout, allocating one bounding volume with respect to the plurality of solid bodies is convenient because the processing speed can be increased without lowering the culling precision in practice.

(3) The inner quadrangular frame computing portion 94 in the above embodiment computes an inscribed quadrangle, which is obtained by linking the center points on each side of the outer quadrangular frame computed by the reference axis-parallel outer quadrangular frame computing portion 93, as the inner quadrangular frame. However, other inner quadrangular frames obtained through other geometrical methods may be adopted. For example, an inscribed quadrangle obtained by linking n equally-spaced points, such as three equally-spaced points on each side of the outer quadrangular frame can be computed as the inner quadrangular frame.

(4) The inner quadrangular frame computing portion 94 computes an inner quadrangular frame inscribed on an outer quadrangular frame computed by the reference axis-parallel outer quadrangular frame computing portion 93. However, the expression "inscribed" here does not demand strict mathematical precision, and should instead be construed as also including an inner quadrangular frame that is a quadrangle that is somewhat smaller than the inscribed quadrangle actually inscribed on the outer quadrangular frame, and, in some embodiments, resembles the inscribed quadrangle.

In some embodiments, a bounding volume is set by using an inner quadrangular frame inscribed on an outer quadrangular frame that encloses a plane outer profile of a solid body as a reference plane, i.e., as a cross section (a bottom plane at a ground level) and extending the bounding volume therefrom to a height of the solid body. Since the reference plane is the inner quadrangular frame inscribed on the outer quadrangular frame, when comparing the inner quadrangular frame and the outer quadrangular frame, a width of the inner quadrangular frame is equal to or less than a width of the outer quadrangular frame in any direction. This in turn can suppress the past problem of unnecessarily culling many bounding volumes behind the viewpoint due to a bounding volume expressed excessively larger than the enclosed solid body, and not showing (not drawing) a solid body that should be visible in the three-dimensional image ultimately rendered. In addition, the inner quadrangular frame acting as the reference plane of the bounding volume is inscribed on the outer quadrangular frame, and can therefore help keep the bounding volume from being expressed excessively smaller than the actual solid body as well.

Here, the inner quadrangular frame is computed as a quadrangle obtained by linking center points on each side of the outer quadrangular frame. Accordingly, if the outer quadrangular frame is a rectangle and the inner quadrangular frame is a diamond, for example, then the corners of the inner quadrangular frame are located on the sides of the outer quadrangular frame. Therefore, a shape of the inner quadrangular frame generally covers the shape of the solid body and is half the size of the outer quadrangular frame. It is thus possible to considerably suppress the past problem where the generated bounding volume is significantly larger than a region masked by the actual solid body. Since the sides are equal, a geometrical calculation load thereof is also less than that for a general polygon.

The outer quadrangular frame is in some embodiments computed so as to have sides that are parallel to a set reference lateral axis and a set reference longitudinal axis. All the bounding volumes are thus rectangles with the same orientation, which facilitates their use in computations. When combined with the characteristics of the diamond-shaped inner quadrangular frame, the culling process can make a determination with nearly complete accuracy regarding a view volume with a visual axis that is inclined with respect to the reference lateral axis and the reference longitudinal axis. Note that in consideration of the application of the three-dimensional data processing device to a map information system such as a navigation device, longitude and latitude can be conveniently adopted for the reference lateral axis and the reference longitudinal axis.

Furthermore, the three-dimensional data processing device is in some embodiments configured such that the bounding volume generating unit finds a plurality of inner quadrangular frame from the plane outer profile obtained for every one of a plurality of height levels of a solid body subject to processing, and generates a bounding volume of the solid body using the plurality of inner quadrangular frames as a reference plane. With such a configuration, the bounding volume generating unit computes a plurality of inner quadrangular frames for each predetermined height level to generate a sub bounding volume, and the sub bounding volumes are stacked to generate a final bounding volume. Therefore, even in cases involving a solid body whose lateral cross section size considerably differs depending on the height level, an accurate culling determination can be achieved. In particular, the lateral cross sections of buildings and the like are often different at upper and lower floors, which makes the three-dimensional data processing device suited for drawing a three-dimensional map image where the solid bodies are buildings in practice.

In the culling process, it is convenient in terms of computing speed to use occlusion culling that excludes a certain bounding volume as a target for drawing only when that bounding volume is completely masked by another bounding volume. For this reason, in some embodiments, the culling processing unit is configured so as to determine whether a solid body is drawn based on an occlusion culling method.

Further embodiments also include a three-dimensional image generating device incorporating the three-dimensional data processing device described above. Such a three-dimensional image generating device is provided with a three-dimensional image drawing unit that generates a three-dimensional image in the view volume with reference to a determination result made by the culling processing unit, as well as various characteristic configurations of the three-dimensional image generating device as described.

Further embodiments also include a navigation device incorporating the above three-dimensional image generating device. Such a navigation device is provided with structural elements required for an ordinary navigation device, as well as various characteristic configurations of the three-dimensional image generating device as described. The navigation device is in some embodiments configured such that the viewpoint is determined based on a host vehicle position detected by a host vehicle position information detecting unit, and a visual axis from the viewpoint is determined so as to follow a guidance route. Thus, the guidance route can be displayed and guide a user as a three-dimensional image drawn by the three-dimensional image generating device having the characteristics described above.

Further embodiments also include a computer-readable medium containing a three-dimensional data processing program for two-dimensionally displaying a three-dimensional space using stereographic data pertaining to a solid body. Such a three-dimensional data processing program when executed causes a computer platform to perform the functions of: generating a bounding volume of the solid body using the stereographic data of the solid body and using, as a reference plane, an inner quadrangular frame inscribed on an outer quadrangular frame that encloses a plane outer profile of the solid body; setting a view volume based on a set viewpoint; and determining a solid body subject to drawing within the view volume using the generated bounding volume. Such a three-dimensional data processing program is capable of obtaining the operations and effects described for the three-dimensional data processing device above, and is capable of incorporating several additional art as described.

What is claimed is:

1. A three-dimensional data processing device for two-dimensionally displaying a three-dimensional space using stereographic data pertaining to a solid body, the device comprising a hardware computer platform which is configured to include:
 a bounding volume generating unit for generating a bounding volume of the solid body using the stereographic data;
 a viewpoint setting unit for setting a viewpoint;
 a view volume setting unit for setting a view volume based on the viewpoint; and
 a culling processing unit for determining whether or not to draw the solid body within the view volume using the generated bounding volume, wherein
 the bounding volume generating unit includes
  a stereographic-data obtaining unit for obtaining the stereographic data,
  a plane-data obtaining unit for obtaining bottom plane data of the solid body from the stereographic data,
  an outer-quadrangular-frame obtaining unit for obtaining an outer quadrangular frame that encloses a bottom plane of the solid body defined by the bottom plane data,
  an inner-quadrangular-frame obtaining unit for obtaining an inner quadrangular frame inscribed within the outer quadrangular frame, wherein the inner-quadrangular-frame obtaining unit is configured to compute the inner quadrangular frame by linking center points on each side of the outer quadrangular frame,
  a bounding-volume-geometry-data determining unit for determining bounding volume geometry data for generating the bounding volume of the solid body using the inner quadrangular frame as a reference plane, and
  a bounding-volume output unit for generating the bounding volume of the solid body from the bounding volume geometry data and outputting the generated bounding volume.

2. The device according to claim 1, wherein the outer-quadrangular-frame obtaining unit is configured to compute the outer quadrangular frame so as to have sides that are parallel to a set reference lateral axis and a set reference longitudinal axis.

3. The device according to claim 1, wherein the bounding volume generating unit is configured to
 generate the bounding volume by dividing the solid body into a plurality of sub-solid bodies by a predetermined height level to obtain a plurality of inner quadrangular frames from the sub-solid bodies,
 generate a plurality of sub-bounding volumes of the sub-solid bodies, and
 generate the bounding volume of the solid body by stacking the sub-bounding volumes.

4. The device according to claim 1, wherein the culling processing unit is configured to determine whether or not to draw the solid body based on an occlusion culling method.

5. The device according to claim 1, further comprising
 a three-dimensional image drawing unit for generating a three-dimensional image in the view volume based on a determination result made by the culling processing unit and the stereographic data.

6. The device according to claim 5, further comprising:
 a position information detecting unit for detecting a current position of the navigation device,
 wherein
 the viewpoint setting unit is configured to set the viewpoint based on the current position detected by the position information detecting unit, and
 the navigation device further comprises a visual-axis determining unit for determining a visual axis from the viewpoint so as to follow a guidance route from the current position to a destination.

7. The device according to claim 1, wherein the inner-quadrangular-frame obtaining unit is configured to compute the inner quadrangular frame by linking n-equally-spaced points on each side of the outer quadrangular frame.

8. A non-transitory computer-readable medium containing a three-dimensional data processing program for two-dimensionally displaying a three-dimensional space using stereographic data pertaining to a solid body, the program when executed by a hardware computer platform causing the computer platform to perform the functions of:
 generating a bounding volume of the solid body using the stereographic data;
 setting a view point;
 setting a view volume based on the viewpoint; and
 determining whether or not to draw the solid body within the view volume using the generated bounding volume, wherein
 the generating includes
  obtaining the stereographic data,
  obtaining bottom plane data of the solid body from the stereographic data,
  obtaining an outer quadrangular frame that encloses a bottom plane of the solid body defined by the bottom plane data,
  obtaining an inner quadrangular frame inscribed within the outer quadrangular frame, wherein obtaining the inner-quadrangular-frame comprises computing the inner quadrangular frame by linking center points on each side of the outer quadrangular frame,
  determining bounding volume geometry data for generating the bounding volume of the solid body using the inner quadrangular frame as a reference plane, and
  generating the bounding volume of the solid body from the bounding volume geometry data and outputting the generated bounding volume.

9. A method of two-dimensionally displaying a three-dimensional space using stereographic data pertaining to a solid body, the method being performed by a three-dimensional data processing device comprising a hardware computer platform which is configured to include a bounding volume generating unit, a viewpoint setting unit, a view volume setting unit, and a culling processing unit, the method comprising:
 generating, using the bounding volume generating unit, a bounding volume of the solid body using the stereographic data;
 setting, using the viewpoint setting unit, a viewpoint;
 setting, using the view volume setting unit, a view volume based on the viewpoint; and
 determining, using the culling processing unit, whether or not to draw the solid body within the view volume using the generated bounding volume, wherein the generating the bounding volume of the solid body further includes
obtaining the stereographic data,
obtaining bottom plane data of the solid body from the stereographic data,
obtaining an outer quadrangular frame that encloses a bottom plane of the solid body defined by the bottom plane data,
obtaining an inner quadrangular frame inscribed within the outer quadrangular frame, wherein obtaining the inner-quadrangular-frame comprises computing the inner quadrangular frame by linking center points on each side of the outer quadrangular frame,
determining bounding volume geometry data for generating the bounding volume of the solid body using the inner quadrangular frame as a reference plane, and
generating the bounding volume of the solid body from the bounding volume geometry data and outputting the generated bounding volume.

10. The method according to claim 9, wherein obtaining the bottom plane of the solid body comprises computing or extracting the bottom plane data from the stereographic data.

11. The method according to claim 9, wherein obtaining an outer quadrangular frame comprises obtaining a circumscribed quadrangle tangent to the bottom plane as the outer quadrangular frame.

12. The method according to claim 9, wherein obtaining the outer quadrangular frame comprises at least one side having a predetermined clearance with the bottom plane.

13. The method according to claim 9, wherein generating the bounding volume comprises using the inner quadrangular frame as a bottom plane of the bounding volume.

14. The method according to claim 9, wherein generating the bounding volume comprises:
computing a quadrangular prism geometry as the bounding volume,
creating the quadrangular prism geometry by using the inner quadrangular frame as a bottom plane of the quadrangular prism geometry, and
extending the quadrangular prism geometry up to a height of the solid body.

15. The method according to claim 9, wherein generating the bounding volume comprises:
dividing the solid body into a plurality of sub-solid bodies by a predetermined height level to obtain a plurality of inner quadrangular frames from the sub-solid bodies, generating a plurality of sub-bounding volumes of the sub-solid bodies, and
generating the bounding volume of the solid body by stacking the sub-bounding volumes, and
dividing the solid body into a ground level, and an intermediate height level at which a lateral cross-sectional shape of the solid body changes.

16. The method according to claim 15, wherein
the plurality of inner quadrangular frames includes a first inner quadrangular frame corresponding to the ground level and a second inner quadrangular frame corresponding to the intermediate height level, and
the stacking includes stacking a second sub bounding volume generated by using the second inner quadrangular frame on top of a first sub bounding volume generated by using the first inner quadrangular frame.

17. The method according to claim 9, wherein obtaining the inner quadrangular frame comprises computing the inner quadrangular frame by linking n-equally-spaced points on each side of the outer quadrangular frame.

18. The method according to claim 9, wherein the inner quadrangular frame inscribed on the outer quadrangular frame includes an inner quadrangular frame that is a quadrangle that is smaller than the inscribed quadrangle actually inscribed within the outer quadrangular frame.

19. The method according to claim 9, wherein obtaining the inner quadrangular frame comprises computing the inner quadrangular frame by linking center points on each side of the outer quadrangular frame.

* * * * *